(12) United States Patent
Park

(10) Patent No.: US 8,322,159 B2
(45) Date of Patent: Dec. 4, 2012

(54) AIR CONDITIONING SYSTEM FOR COMMUNICATION EQUIPMENT AND CONTROLLING METHOD THEREOF

(75) Inventor: Hee Tae Park, Seoul (KR)

(73) Assignee: Chang Jo 21 Co., Ltd., Gyeonggi-do (KR)

( * ) Notice: Subject to any disclaimer, the term of this patent is extended or adjusted under 35 U.S.C. 154(b) by 1155 days.

(21) Appl. No.: 12/278,544

(22) PCT Filed: Sep. 15, 2006

(86) PCT No.: PCT/KR2006/003690
§ 371 (c)(1),
(2), (4) Date: Aug. 6, 2008

(87) PCT Pub. No.: WO2007/091755
PCT Pub. Date: Aug. 16, 2007

(65) Prior Publication Data
US 2009/0056370 A1 Mar. 5, 2009

(30) Foreign Application Priority Data
Feb. 7, 2006 (KR) .................. 10-2006-0011533

(51) Int. Cl.
*F25D 17/00* (2006.01)
*F25D 17/02* (2006.01)
(52) U.S. Cl. .............. 62/333; 62/335; 62/185; 62/436
(58) Field of Classification Search .............. 62/175, 62/185, 259.2, 333, 335, 436, 513
See application file for complete search history.

(56) References Cited

U.S. PATENT DOCUMENTS 5,797,275 A * 8/1998 Forsman .................... 62/175
6,131,401 A * 10/2000 Ueno et al. ................. 62/175

FOREIGN PATENT DOCUMENTS

| JP | 10-197028 | 7/1998 |
| JP | 2004-278813 | 10/2004 |
| KR | 10-2003-0009820 | 2/2003 |
| KR | 10-2004-0008302 | 1/2004 |

* cited by examiner

*Primary Examiner* — Cheryl J Tyler
*Assistant Examiner* — Lakiya Rogers
(74) *Attorney, Agent, or Firm* — Rabin & Berdo, P.C.

(57) ABSTRACT

An air conditioning system for communication equipment includes an indoor module placed inside a base station and an outdoor module placed outside the base station. The indoor module has a first indoor heat exchanger installed on a brine pipe and having a heat exchange tube, an expansion valve installed on a refrigerant pipe, a second indoor heat exchanger having a heat exchange tube to which the refrigerant pipe is connected, a compressor for compressing refrigerant, and an indoor blower. The outdoor module has a brine pump installed on the brine pipe, a first outdoor heat exchanger having a heat exchange tube to which the brine pipe extending from the brine pump and the first indoor heat exchanger is connected, a second outdoor heat exchanger having a heat exchange tube to which the refrigerant pipe, extending from the compressor and the expansion valve, is connected, and an outdoor blower.

6 Claims, 8 Drawing Sheets

AIR CONDITIONING SYSTEM FOR COMMUNICATION EQUIPMENT AND CONTROLLING METHOD THEREOF

TECHNICAL FIELD

The present invention relates to air conditioning of communication equipment, and more particularly, to an air conditioning system for communication equipment which is arranged in a base station, a booth, etc. to cool communication equipment disposed therein, and is decreased in size to prevent noise generation, overheating and malfunction thereof and to ensure stable operation of the communication equipment, and a control method thereof.

BACKGROUND ART

A conventional air conditioning system employs evaporation heat which is absorbed by refrigerant from the surroundings when the refrigerant evaporates. As the refrigerant, liquids such as ammonia, Freon, an azeotropic refrigerant mixture, chloromethyl, and so on, which can easily evaporate even at low temperatures, are generally used.

In the conventional air conditioning system, as a vaporized refrigerant, which is compressed by a compressor to a high pressure, flows through a condenser, the refrigerant exchanges heat with the outside air, and condenses to a liquid refrigerant having a high pressure. The liquid refrigerant having a high pressure is then converted into a low pressure liquid refrigerant after passing through an expansion valve or a capillary tube.

The low pressure liquid refrigerant enters an evaporator, exchanges heat with indoor air, and evaporates. Thereafter, the evaporated low pressure refrigerant enters the compressor to complete an air conditioning cycle which is continuously repeated. The air cooled by the uptake of evaporation heat by the refrigerant in the evaporator is directed to a target space or object by a blower fan to conduct a cooling function.

The conventional air conditioner uses refrigerant which can easily undergo a phase change, such as through condensation and evaporation, to cool a target space or object.

Meanwhile, in a base station or a communication car, various wired or wireless communication equipment is installed. The communication equipment is likely to have loose connections or to break down due to frequent heat generation, whereby the possibility of malfunction increases. For this reason, it is necessary to cool the communication equipment all year round to ensure reliable operation thereof.

However, in the conventional air conditioning system for communication equipment, since naturally cold outside temperatures are not appropriately used and the air conditioning system is driven only by electric power, electric power is wasted.

DISCLOSURE

Technical Problem

Accordingly, the present invention has been made in an effort to solve the problems occurring in the related art, and an object of the present invention is to provide an air conditioning system for communication equipment in which the sizes of indoor and outdoor modules are decreased and noise generation is reduced, and which appropriately employs naturally cold outside temperatures to minimize electric power consumption, thereby reliably maintaining the communication equipment in a cooled state, and a control method thereof.

Technical Solution

In order to achieve the above object, according to one aspect of the present invention, there is provided an air conditioning system for communication equipment, comprising:

an indoor module placed inside a base station in which communication equipment is installed, the indoor module having a first indoor heat exchanger which is installed on a brine pipe and has a heat exchange tube, an expansion valve which is installed on a refrigerant pipe, a second indoor heat exchanger which has a heat exchange tube to which the refrigerant pipe, extending from the expansion valve, is connected, a compressor which compresses refrigerant having passed through the second indoor heat exchanger, and an indoor blower which is arranged adjacent to the first and second indoor heat exchangers; and an outdoor module placed outside the base station, the outdoor module having a brine pump which is installed on the brine pipe extending from the first indoor heat exchanger, a first outdoor heat exchanger which has a heat exchange tube to which the brine pipe extending from the brine pump and the brine pipe extending from the first indoor heat exchanger are connected, a second outdoor heat exchanger which has a heat exchange tube to which the refrigerant pipe extending from the compressor and the refrigerant pipe extending from the expansion valve are connected, and an outdoor blower which is arranged adjacent to the first and second outdoor heat exchangers.

According to another aspect of the present invention, the indoor blower sequentially passes indoor air through the first and second indoor heat exchangers and supplies it to the communication equipment, and the outdoor blower sequentially passes outdoor air through the first and second outdoor heat exchangers and directs it to the atmosphere.

According to another aspect of the present invention, an indoor temperature sensor is installed inside the base station, an outdoor temperature sensor is installed outside the base station, and a brine temperature sensor is installed on the portion of the brine pipe that extends to the outdoor module after passing through the first indoor heat exchanger.

According to another aspect of the present invention, there is provided a method for controlling the air conditioning system, comprising:

a first step of sensing indoor and outdoor temperatures of the base station and a brine temperature using the indoor and outdoor temperature sensors and the brine temperature sensor;

a second step of comparing the indoor temperature with a first reference temperature and interrupting the operation of the entire air conditioning system when the indoor temperature is lower than the first reference temperature;

a third step of comparing the outdoor temperature with the brine temperature, actuating the first indoor and outdoor heat exchangers when the outdoor temperature is lower than the brine temperature, and interrupting the operation of the first indoor and outdoor heat exchangers when the outdoor temperature is not lower than the brine temperature; and a fourth step of actuating the second indoor and outdoor heat exchangers when the indoor temperature is higher than a second reference temperature, and interrupting the operation of the second indoor and outdoor heat exchangers when the indoor temperature is not higher than the second reference temperature.

According to still another aspect of the present invention, the third step further comprises a third-first step of interrupting the operation of the outdoor blower when the brine temperature is lower than a third reference temperature, and actuating the outdoor blower when the brine temperature is not lower than the third reference temperature.

According to a still further aspect of the present invention, the third-first step further comprises a third-second step of interrupting the operation of the outdoor blower when the brine temperature is not lower than the third reference temperature and is lower than a fourth reference temperature, and actuating the outdoor blower when the brine temperature is not lower than the fourth reference temperature.

Advantageous Effects

Thanks to the above features, the air conditioning system for communication equipment and the control method thereof according to the present invention, constructed as mentioned above, provide advantages in that the sizes of indoor and outdoor modules are decreased, noise generation is reduced, and naturally cold outside temperatures are appropriately employed to minimize electric power consumption and elevate cooling efficiency. Further, since a refrigerant circulation structure and a heat exchange structure, which use double cooling lines, are adopted, cooling efficiency and reliability are improved.

DESCRIPTION OF DRAWINGS

The above objects, and other features and advantages of the present invention will become more apparent after a reading of the following detailed description taken in conjunction with the drawings, in which.

DESCRIPTION OF REFERENCE NUMERALS FOR MAIN PARTS OF DRAWINGS

Figure 1:
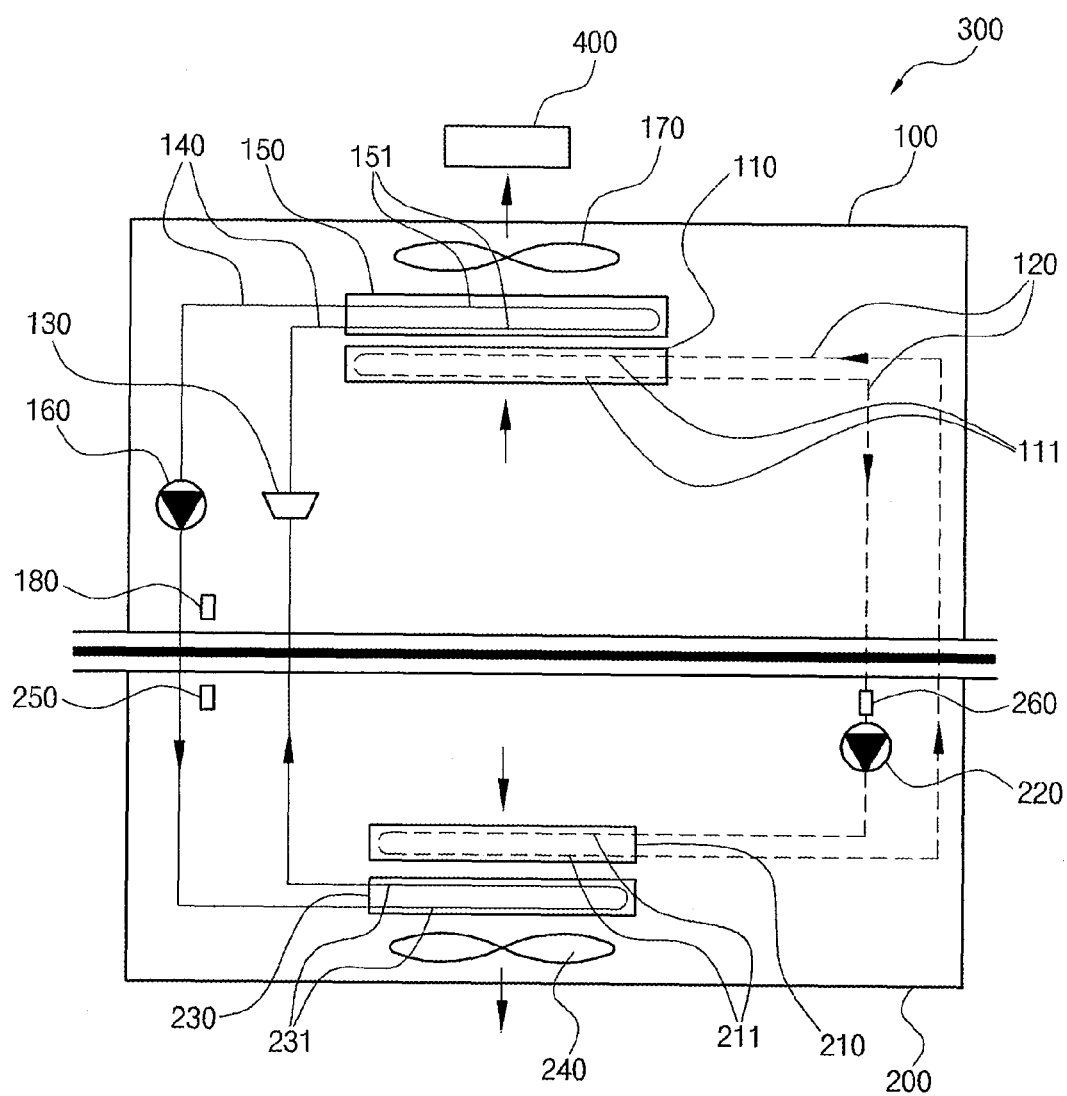
FIG. 1 is a structural view illustrating an air conditioning system for communication equipment in accordance with an embodiment of the present invention.

100, 100': indoor modules
110, 110': first indoor heat exchangers
111, 111': heat exchange tubes
120, 120': brine pipes
130, 130': expansion valves
140, 140': refrigerant pipes
150, 150': second indoor heat exchangers
151, 151': heat exchange tubes
160, 160': compressors
170, 170': indoor blowers
180, 180': indoor temperature sensors
200, 200': outdoor modules
210, 210': first outdoor heat exchangers
211, 211': heat exchange tubes
220, 220': brine pumps
230, 230': second outdoor heat exchangers
231, 231': heat exchange tubes
240: outdoor blower
240': third outdoor heat exchanger
241': heat exchange tube
250: outdoor temperature sensor
250': fourth outdoor heat exchanger
251': heat exchange tube
260: brine temperature sensor
260': outdoor blower
270': outdoor temperature sensor
280': brine temperature sensor
300, 300': base stations
400, 400': communication equipment

BEST MODE

Reference will now be made in greater detail to a preferred embodiment of the invention, an example of which is illustrated in the accompanying drawings.

Figure 2:
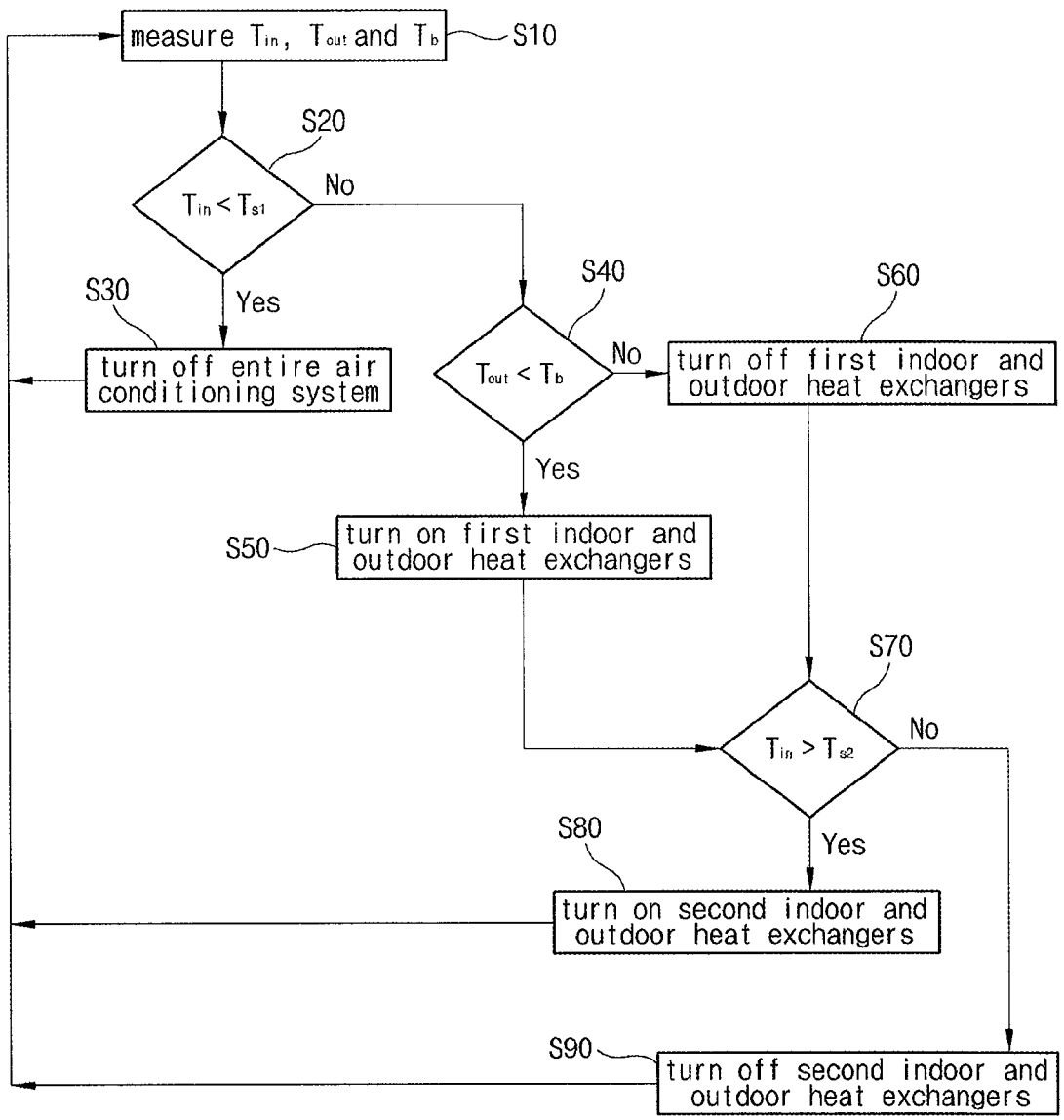
FIG. 2 is a flow chart illustrating a method for controlling an air conditioning system for communication equipment in accordance with another embodiment of the present invention.
Figure 3:
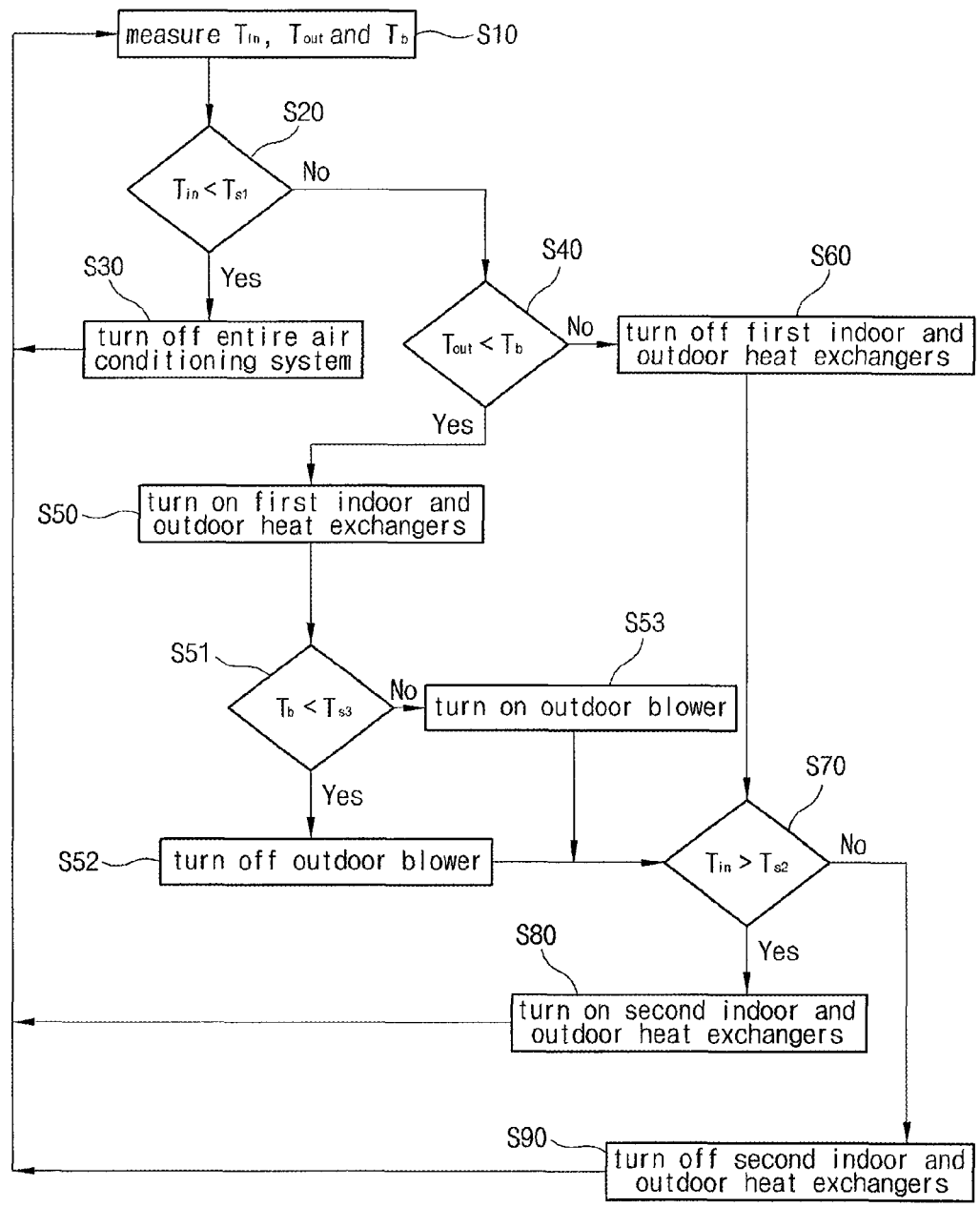
FIG. 3 is a flow chart illustrating a method for controlling an air conditioning system for communication equipment in accordance with another embodiment of the present invention.

FIG. 1 is a structural view illustrating an air conditioning system for communication equipment in accordance with the present invention, FIG. 2 is a flow chart illustrating a method for controlling an air conditioning system for communication equipment in accordance with the present invention, and FIG. 3 is a flow chart illustrating another method for controlling an air conditioning system for communication equipment in accordance with the present invention.

Referring to FIG. 1, an air conditioning system for communication equipment in accordance with an embodiment of the present invention comprises an indoor module 100 which is placed inside a base station 300 and an outdoor module 200 which is placed outside the base station 300.

The indoor module 100 comprises a first indoor heat exchanger 110, an expansion valve 130, a second indoor heat exchanger 150, a compressor 160, and an indoor blower 170.

The first indoor heat exchanger 110 is installed on a brine pipe 120, and a heat exchange tube 111 disposed therein is connected with the brine pipe 120.

The expansion valve 130 is installed on a refrigerant pipe 140, and abruptly converts the liquid refrigerant, supplied through the refrigerant pipe 140 and having a high pressure, into misty refrigerant with a low temperature and a low pressure.

The refrigerant used in the present invention is one that is well known in the art, such as ammonia, Freon, an azeotropic refrigerant mixture, chloromethyl, or the like.

A heat exchange tube 151 is disposed in the second indoor heat exchanger 150, and is connected with the refrigerant pipe 140, which extends from the expansion valve 130.

The second indoor heat exchanger 150 comprises an evaporator. The second indoor heat exchanger 150 evaporates the misty refrigerant having a low pressure through heat exchange with indoor air, and cools the indoor air using the evaporation heat of the refrigerant.

The compressor 160 is connected to the refrigerant pipe 140 which extends from the second indoor heat exchanger 150, so as to compress the refrigerant having passed through the second indoor heat exchanger 150. The compressor 160 comprises a conventional compressor for compressing evaporated refrigerant to a high pressure.

The indoor blower 170 is positioned adjacent to the heat transfer surfaces of the first and second indoor heat exchangers 110 and 150, on which heat transfer occurs, and is structured so that air cooled through the heat exchange function of the first and second indoor heat exchangers 110 and 150 can be blown to communication equipment 400.

The indoor blower 170 functions to increase contact and heat exchange efficiency between the first and second indoor heat exchangers 110 and 150 and indoor air.

The second indoor heat exchanger 150 is positioned closer to the communication equipment 400 than the first indoor heat exchanger 110, so that the indoor blower 170 can sequentially pass indoor air through the first and second indoor heat exchangers 110 and 150 and then supply it to the communication equipment 400.

This is to allow the indoor air to first pass through the first indoor heat exchanger 110, which has a higher temperature than the second indoor heat exchanger 150 to thereby be gradually cooled. As a consequence, indoor air is prevented from first passing through the second indoor heat exchanger 150, having a lower temperature than the first indoor heat exchanger 110, which would degrade cooling efficiency.

The outdoor module 200 comprises a first outdoor heat exchanger 210, a brine pump 220, a second outdoor heat exchanger 230, and an outdoor blower 240.

The first outdoor heat exchanger 210 has a heat exchange tube 211 disposed therein, and the brine pipe 120 that extends from the brine pump 220 and the brine pipe 120 that extends from the first indoor heat exchanger 110 are individually connected to the heat exchange tube 211.

The second outdoor heat exchanger 230 has a heat exchange tube 231 disposed therein, and portions of the refrigerant pipe 140, which extend from the compressor 160 and the expansion valve 130 of the indoor module 100, are individually connected to the heat exchange tube 231.

The second outdoor heat exchanger 230 comprises a condenser and serves as a kind of heat exchanger which condenses and liquefies the high pressure refrigerant supplied from the compressor 160.

The brine pump 220 is installed on the brine pipe 120 which extends from the first indoor heat exchanger 110 of the indoor module 100.

While one brine pump 220 is illustrated in the drawing, in a variation of the embodiment of the present invention, it is conceivable that a pair of brine pumps 220 is connected to the brine pipe 120 in parallel so that, even when one brine pump 220 does not work, the other brine pump 220 can properly operate, as a result of which the cooled state of the communication equipment 400 arranged in the base station 300 can be reliably maintained.

The outdoor blower 240 is positioned adjacent to the heat transfer surfaces of the first and second outdoor heat exchangers 210 and 230, on which heat transfer occurs, and functions to increase contact and heat exchange efficiency between the first and second outdoor heat exchangers 210 and 230 and outdoor air.

Here, the first outdoor heat exchanger 210 is positioned closer to the outdoor air inlet of the outdoor module 200 than the second outdoor heat exchanger 230, so that the outdoor blower 240 can sequentially pass outdoor air through the first and second outdoor heat exchangers 210 and 230 and direct it to the atmosphere.

This functions to allow outdoor air to first pass through the first outdoor heat exchanger 210, having a lower temperature than the second outdoor heat exchanger 230. Therefore, outdoor air is prevented from first passing through the second outdoor heat exchanger 230, having a higher temperature than the first outdoor heat exchanger 210, and thus decreasing the heat exchange efficiency of the first outdoor heat exchanger 210.

Also, in the present invention, in order to effectively control the cooling function of the air conditioning system, an indoor temperature sensor 180 is installed inside the base station 300, and an outdoor temperature sensor 250 is installed outside the base station 300.

A brine temperature sensor 260 is installed on the portion of the brine pipe 120 that extends to the outdoor module 200 after passing through the first indoor heat exchanger 110.

By comparing the temperatures sensed by the indoor temperature sensor 180, the outdoor temperature sensor 250 and the brine temperature sensor 260 with one another or with reference temperatures, the first indoor and outdoor heat exchangers 110 and 210 and the second indoor and outdoor heat exchangers 150 and 230 can be selectively driven to cool the indoor space of the base station 300.

FIG. 2 is a flow chart illustrating a method for controlling an air conditioning system for communication equipment in accordance with the present invention.

First, the indoor temperature $T_{in}$, the outdoor temperature $T_{out}$, and the brine temperature $T_b$ are sensed in a target space, that is, in the base station 300, using the indoor temperature sensor 180, the outdoor temperature sensor 250, and the brine temperature sensor 260 (S10).—First step.

The indoor temperature $T_{in}$ sensed in this way is compared with a first reference temperature $T_{s1}$ (S20), and when the indoor temperature $T_{in}$ is lower than the first reference temperature $T_{s1}$ (for example, 25° C.), the operation of the entire air conditioning system is interrupted (S30).—Second step.

Then, by comparing the outdoor temperature $T_{out}$ with the brine temperature $T_b$ (S40), when the outdoor temperature $T_{out}$ is lower than the brine temperature $T_b$, the first indoor and outdoor heat exchangers 110 and 210 are actuated (S50), and when the outdoor temperature $T_{out}$ is not lower than the brine temperature $T_b$, the operation of the first indoor and outdoor heat exchangers 110 and 210 is interrupted (S60).—Third step.

The third step is defined to ensure that the operation of the first indoor and outdoor heat exchangers 110 and 210 is interrupted in the hot summertime, when the outdoor temperature $T_{out}$ is not lower than the brine temperature $T_b$, and the first indoor and outdoor heat exchangers 110 and 210 are actuated to use cool outdoor air in spring, early summer, fall and winter, when the outdoor temperature $T_{out}$ is lower than the brine temperature $T_b$.

Next, by comparing the indoor temperature $T_{in}$ with a second reference temperature $T_{s2}$ (for example, 26.5° C.) (S70), when the indoor temperature $T_{in}$ is higher than the second reference temperature $T_{s2}$, the second indoor and outdoor heat exchangers 150 and 230 are actuated (S80), and when the indoor temperature $T_{in}$ is not higher than the second reference temperature $T_{s2}$, the operation of the second indoor and outdoor heat exchangers 150 and 230 is interrupted (S90).—Fourth step.

The fourth step is defined to ensure that, when the communication equipment 400 is not sufficiently cooled by the operation of the first indoor and outdoor heat exchangers 110 and 210, the second indoor and outdoor heat exchangers 150 and 230 can supplementarily operate, so that the heat exchange efficiency of the entire air conditioning system can be continuously maintained at a constant level.

The indoor blower 170 is turned on or off depending upon whether the first and second indoor heat exchangers 110 and 150 are actuated or not (or whether the power supply to the entire air conditioning system is turned on or off), so as to supply cool air to the communication equipment 400.

The first and second reference temperatures $T_{s1}$ and $T_{s2}$ can be respectively set, for example, to 25° C. and 26.5° C., and can be variously changed depending upon the type of communication equipment 400 disposed in the base station 300.

After the respective steps S30, S80 and S90, the program can return to the step S10, depending upon the indoor temperature $T_{in}$, to repeat the preceding steps, as a result of which it is possible to conform in real time to the indoor temperature of the base station 300 which changes depending upon the operation of the first and second indoor and outdoor heat exchangers 110, 150, 210 and 230.

FIG. 3 is a flow chart illustrating a method for controlling an air conditioning system for communication equipment in accordance with an embodiment of the present invention.

In the third step, after the first indoor and outdoor heat exchangers 110 and 210 are actuated (S50) when the outdoor temperature $T_{out}$ is lower than the brine temperature $T_b$ as a result of the comparison between the outdoor temperature $T_{out}$ and the brine temperature $T_b$ (S40), by comparing the brine temperature $T_b$ with a third reference temperature $T_{s3}$ (for example, set to 2~7° C.) (S51), when the brine temperature $T_b$ is lower than the third reference temperature $T_{s3}$, the operation of the outdoor blower 240 is interrupted (S52), and when the brine temperature $T_b$ is not lower than the third reference temperature $T_{s3}$, the outdoor blower 240 is actuated (S53).—Third-first step.

In this third-first step, in the case where the brine temperature $T_b$ is lower than the third reference temperature $T_{s3}$, the operation of the outdoor blower 240 is interrupted without exception (S52) to prevent the brine from being abruptly frozen by excessively low outdoor temperatures in wintertime and the brine pipe 120 from thus being ruptured.

Figure 4:
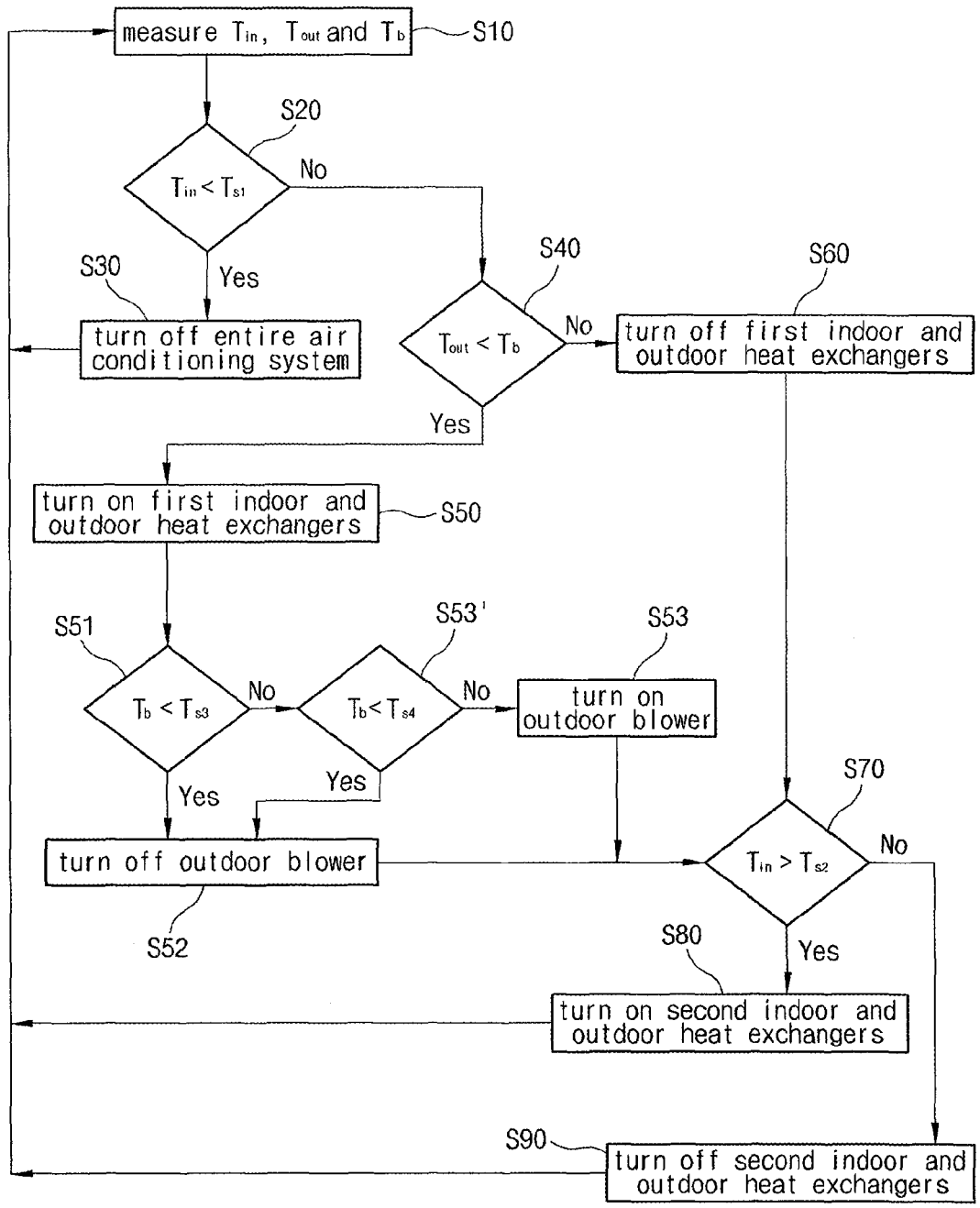
FIG. 4 is a flow chart illustrating a method for controlling an air conditioning system for communication equipment in accordance with another embodiment of the present invention.

More preferably, as can be readily seen from FIG. 4, in the third-first step, when it is determined as a result of the comparison in the step S51 that the brine temperature $T_b$ is not lower than the third reference temperature $T_{s3}$, by comparing the brine temperature $T_b$ with a fourth reference temperature $T_{s4}$ (for example, set to 10~15° C.) (S53'), when the brine temperature $T_b$ is lower than the fourth reference temperature $T_{s4}$, the operation of the outdoor blower 240 is interrupted (S52), and when the brine temperature $T_b$ is not lower than the fourth reference temperature $T_{s4}$, the outdoor blower 240 is actuated (S53).—Third-second step.

This third-second step serves to prevent the generation of overload, vibration and various noise in the outdoor blower 240 due to frequent turning on and off of the outdoor blower 240.

Meanwhile, an air conditioning system for communication equipment according to an embodiment of the present invention comprises:

an indoor module placed inside a base station in which communication equipment is installed, the indoor module having a first indoor heat exchanger which is installed on a brine pipe and has a heat exchange tube, a pair of expansion valves which are respectively installed on different refrigerant pipes, a second indoor heat exchanger which has a pair of heat exchange tubes to which the refrigerant pipes extending from the expansion valves are respectively connected, a pair of compressors which compress refrigerant that has passed through the second indoor heat exchanger, and an indoor blower which is arranged adjacent to the first and second indoor heat exchangers; and an outdoor module placed outside the base station, the outdoor module having a brine pump which is installed on the brine pipe extending from the first indoor heat exchanger, a pair of first and second outdoor heat exchangers which have heat exchange tubes to which the brine pipe extending from the brine pump and the brine pipe extending from the first indoor heat exchanger are connected in series, a pair of third and fourth outdoor heat exchangers which have heat exchange tubes to which the refrigerant pipes extending from the compressors and the refrigerant pipes extending from the expansion valves are connected, and an outdoor blower which is arranged adjacent to the first through fourth outdoor heat exchangers.

The indoor blower sequentially passes indoor air through the first and second indoor heat exchangers and supplies it to the communication equipment, and the outdoor blower sequentially passes outdoor air through the first and third outdoor heat exchangers and through the second and fourth outdoor heat exchangers and directs it to the atmosphere.

An indoor temperature sensor is installed inside the base station, an outdoor temperature sensor is installed outside the base station, and a brine temperature sensor is installed on the portion of the brine pipe that extends to the outdoor module after passing through the first indoor heat exchanger.

In the meanwhile, a method for controlling the air conditioning system according to the present invention comprises:

a first step of sensing indoor and outdoor temperatures of the base station and a brine temperature using the indoor and outdoor temperature sensors and the brine temperature sensor;

a second step of comparing the indoor temperature with a first reference temperature and interrupting the operation of the entire air conditioning system when the indoor temperature is lower than the first reference temperature;

a third step of comparing the outdoor temperature with the brine temperature, actuating the first indoor heat exchanger and the first and second outdoor heat exchangers when the outdoor temperature is lower than the brine temperature, and interrupting the operation of the first indoor heat exchanger and the first and second outdoor heat exchangers when the outdoor temperature is not lower than the brine temperature;

a fourth step of actuating the second and third outdoor heat exchangers when the indoor temperature is higher than a second reference temperature, and interrupting the operation of the second and third outdoor heat exchangers when the indoor temperature is not higher than the second reference temperature; and a fifth step of operating the fourth outdoor heat exchanger when the indoor temperature is higher than a third reference temperature, and interrupting the operation of the fourth outdoor heat exchanger when the indoor temperature is not higher than the third reference temperature.

Preferably, the third step further comprises a third-first step of interrupting the operation of the outdoor blower when the brine temperature is lower than a fourth reference temperature, and actuating the outdoor blower when the brine temperature is not lower than the fourth reference temperature.

More preferably, the third-first step further comprises a third-second step of interrupting the operation of the outdoor blower when the brine temperature is not lower than the fourth reference temperature and is lower than a fifth reference temperature, and actuating the outdoor blower when the brine temperature is not lower than the fifth reference temperature.

Hereafter, other preferred embodiments of the present invention will be described with reference to the attached drawings.

Figure 5:
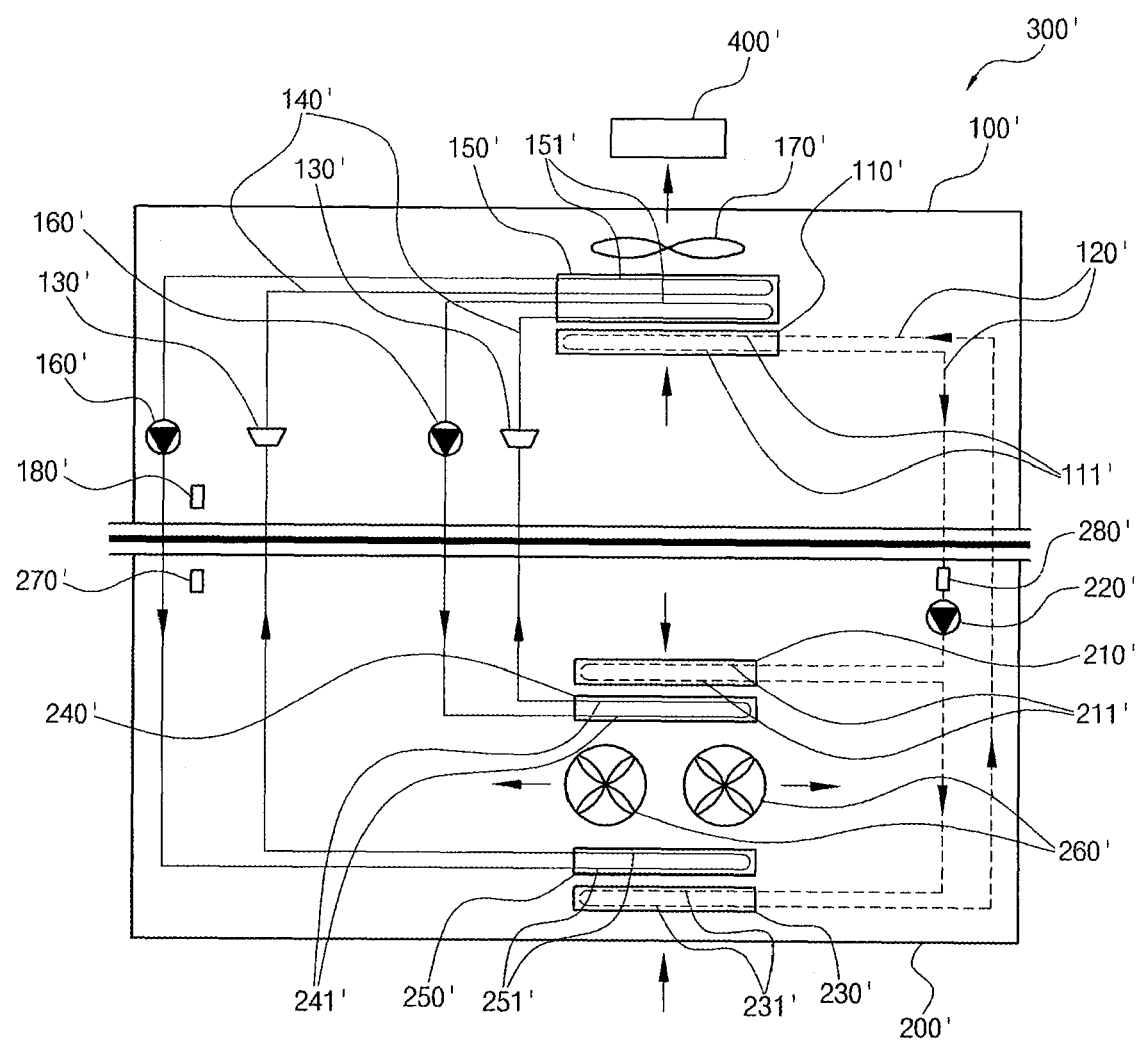
FIG. 5 is a structural view illustrating an air conditioning system for communication equipment in accordance with another embodiment of the present invention.
Figure 6:
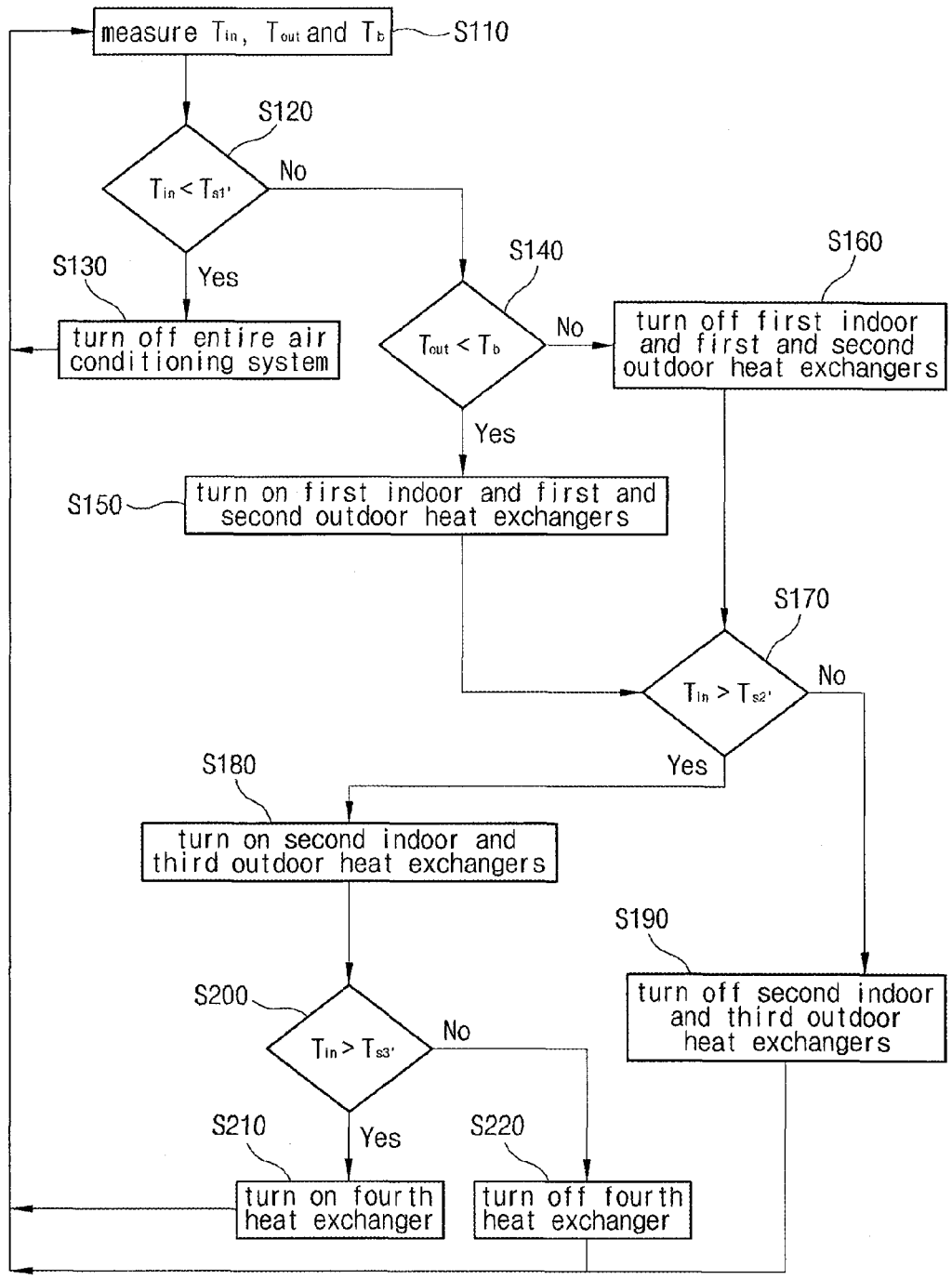
FIG. 6 is a flow chart illustrating a method for controlling an air conditioning system for communication equipment illustrated in FIG. 5.
Figure 7:
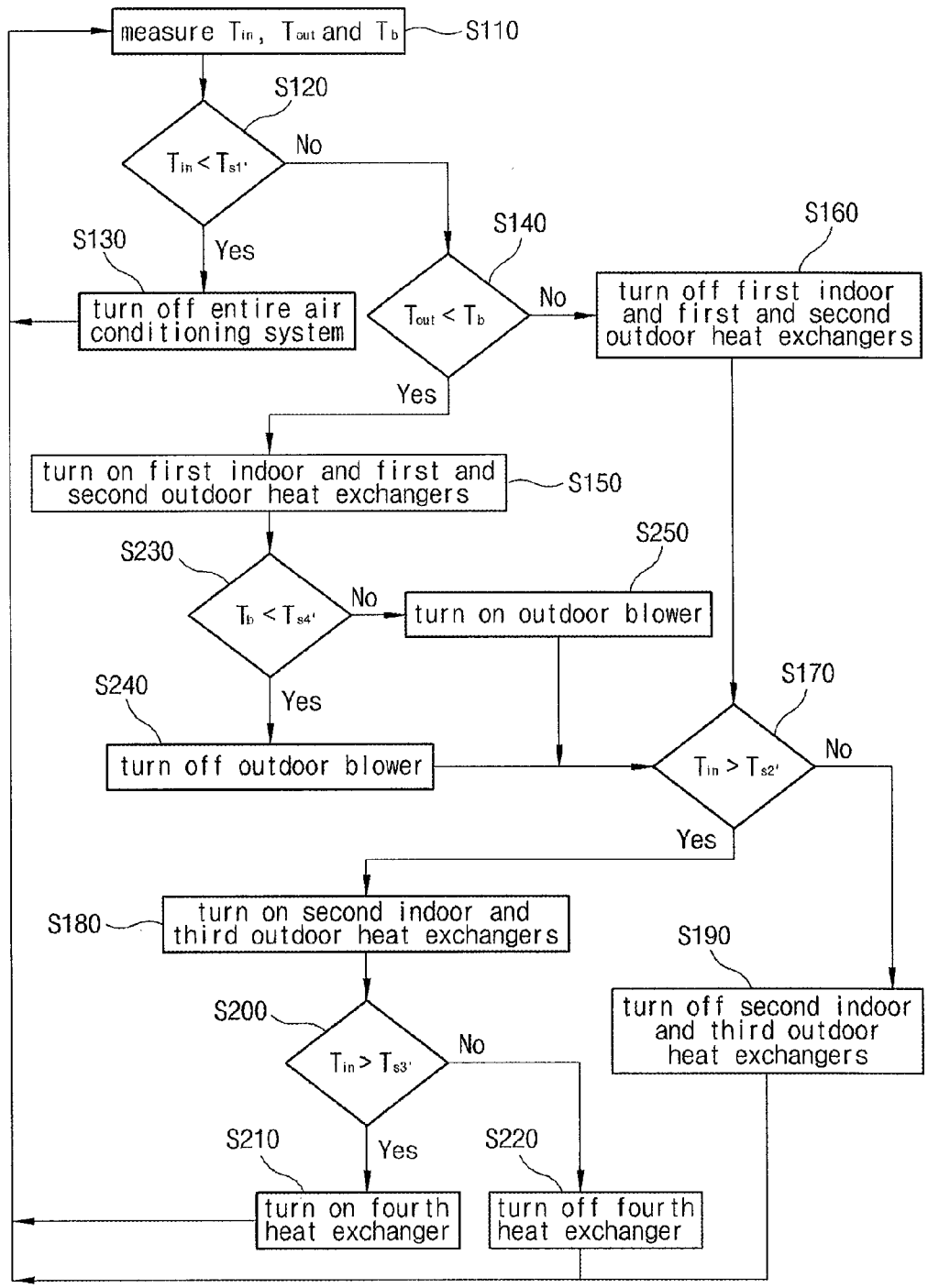
FIG. 7 is a flow chart illustrating another method for controlling an air conditioning system for communication equipment illustrated in FIG. 5.

FIG. 5 is a structural view illustrating an air conditioning system for communication equipment in accordance with another embodiment of the present invention, FIG. 6 is a flow chart illustrating a method for controlling the air conditioning system for communication equipment shown in FIG. 5, and FIG. 7 is a flow chart illustrating another method for controlling the air conditioning system for communication equipment shown in FIG. 5.

Referring to FIG. 5, an air conditioning system for communication equipment in accordance with another embodiment of the present invention comprises an indoor module 100' which is placed inside a base station 300' and an outdoor module 200' which is placed outside the base station 300'.

The indoor module 100' comprises a first indoor heat exchanger 110', a pair of expansion valves 130', a pair of compressors 160', a second indoor heat exchanger 150', and an indoor blower 170'.

The first indoor heat exchanger 110' is installed on a brine pipe 120', and a heat exchange tube 111' disposed therein is connected with the brine pipe 120'.

The expansion valves 130' are installed on different refrigerant pipes 140' to define a pair, and function to abruptly convert the liquid refrigerant, supplied through the refrigerant pipes 140' and having a high pressure, into misty refrigerant with a low temperature and a low pressure.

A pair of heat exchange tubes 151' are disposed in the second indoor heat exchanger 150', and are respectively connected with the refrigerant pipes 140' which extend from the expansion valves 130'.

The second indoor heat exchanger 150' comprises an evaporator. The second indoor heat exchanger 150' evaporates the misty refrigerant having a low pressure through heat exchange with indoor air, and cools the indoor air using the evaporation heat of the refrigerant.

The compressors 160' are respectively connected to the refrigerant pipes 140' which extend from the second indoor heat exchanger 150', so as to compress the refrigerant having passed through the second indoor heat exchanger 150'. Each of the compressors 160' comprises a conventional compressor for compressing evaporated refrigerant to a high pressure.

The indoor blower 170' is positioned adjacent to the heat transfer surfaces of the first and second indoor heat exchangers 110' and 150', on which heat transfer occurs, and is structured so that air cooled through the heat exchange function of the first and second indoor heat exchangers 110' and 150' can be blown to communication equipment 400'.

The indoor blower 170' functions to increase contact and heat exchange efficiency between the first and second indoor heat exchangers 110' and 150' and indoor air.

The second indoor heat exchanger 150' is positioned closer to the communication equipment 400' than the first indoor heat exchanger 110', so that the indoor blower 170' can sequentially pass indoor air through the first and second indoor heat exchangers 110' and 150' and then supply it to the communication equipment 400'.

This is to allow the indoor air to first pass through the first indoor heat exchanger 110', having a higher temperature than the second indoor heat exchanger 150', and to thereby be gradually cooled. As a consequence, indoor air is prevented from first passing through the second indoor heat exchanger 150', having a lower temperature than the first indoor heat exchanger 110', which would decrease cooling efficiency.

The outdoor module 200' comprises a first outdoor heat exchanger 210', a brine pump 220', a second outdoor heat exchanger 230', a third outdoor heat exchanger 240', a fourth outdoor heat exchanger 250', and an outdoor blower 260'.

The first outdoor heat exchanger 210' has a heat exchange tube 211' disposed therein, and the brine pipe 120', which extends from the brine pump 220', is connected to the heat exchange tube 211'.

The second outdoor heat exchanger 230' has a heat exchange tube 231' disposed therein, and the brine pipe 120', which extends from the first outdoor heat exchanger 210', is connected to the heat exchange tube 231'. In succession, the brine pipe 120', which extends from the second outdoor heat exchanger 230', is connected to the heat exchange tube 111' of the first indoor heat exchanger 110'.

That is to say, the first and second outdoor heat exchangers 210' and 230' are sequentially installed on the brine pipe 120', which extends from the brine pump 220', and are connected in series to the first indoor heat exchanger 110'.

The third outdoor heat exchanger 240' has a heat exchange tube 241' disposed therein, and portions of the refrigerant tube 140', which extend from the first compressor 160' and the first expansion valve 130' of the indoor module 100', are connected to the heat exchange tube 241'.

The fourth outdoor heat exchanger 250' has a heat exchange tube 251' disposed therein, and portions of the refrigerant tube 140', which extend from the second compressor 160' and the second expansion valve 130' of the indoor module 100', are connected to the heat exchange tube 251'.

Each of the third and fourth outdoor heat exchangers 240' and 250' comprises a condenser and serves as a kind of heat exchanger which condenses and liquefies the high pressure refrigerant supplied from the compressor 160'.

The brine pump 220' is installed on the brine pipe 120', which extends from the first indoor heat exchanger 110' of the indoor module 100'.

While one brine pump 220' is illustrated in the drawing, in a variation of the embodiment of the present invention, it is possible for a pair of brine pumps 220' to be connected to the brine pipe 120' in parallel so that, even when one brine pump 220' does not work, the other brine pump 220' can properly operate, as a result of which the cooled state of the communication equipment 400' arranged in the base station 300' can be reliably maintained.

The outdoor blower 260' is positioned adjacent to the heat transfer surfaces of the first through fourth outdoor heat exchangers 210', 230', 240' and 250', on which heat transfer occurs, and functions to increase contact and heat exchange efficiency between the first through fourth outdoor heat exchangers 210', 230', 240' and 250' and outdoor air. It is preferred that a plurality of outdoor blowers 260' be arranged between the pair of first and third outdoor heat exchangers 210' and 240' and the pair of second and fourth outdoor heat exchangers 230' and 250'.

Here, the pair of first and third outdoor heat exchangers 210' and 240' and the pair of second and fourth outdoor heat exchangers 230' and 250' are located opposite each other. The first and second outdoor heat exchangers 210' and 230' are positioned closer to the outdoor air inlet of the outdoor module 200' than the third and fourth outdoor heat exchangers 240' and 250', so that the outdoor blower 260' can sequentially pass outdoor air through the first and second outdoor heat exchangers 210' and 230' and then through the third and fourth outdoor heat exchangers 240' and 250' and direct it to the atmosphere.

This serves to allow outdoor air to first pass through the first and second outdoor heat exchangers 210' and 230', having a lower temperature than the third and fourth outdoor heat exchangers 240' and 250'. Therefore, outdoor air is prevented from first passing through the third and fourth outdoor heat exchangers 240' and 250', having a higher temperature than the first and second outdoor heat exchangers 210' and 230', which would decrease the heat exchange efficiency of the first and second outdoor heat exchangers 210' and 230'.

Also, in the present invention, in order to effectively control the cooling function of the air conditioning system, an indoor temperature sensor 180' is installed inside the base station 300', and an outdoor temperature sensor 270' is installed outside the base station 300'.

A brine temperature sensor 280' is installed on the portion of the brine pipe 120' that extends to the outdoor module 200' after passing through the first indoor heat exchanger 110'.

By comparing the temperatures sensed by the indoor temperature sensor 180', the outdoor temperature sensor 270' and the brine temperature sensor 280' with one another or with reference temperatures, the first indoor and first and second outdoor heat exchangers 110', 210' and 230' and the second indoor and third and fourth outdoor heat exchangers 150', 240' and 250' can be selectively driven to cool the indoor space of the base station 300'.

FIG. 6 is a flow chart illustrating a method for controlling the air conditioning system for communication equipment shown in FIG. 5.

First, the indoor temperature $T_{in}$, the outdoor temperature $T_{out}$, and the brine temperature $T_b$ are sensed in a target space, that is, in the base station 300', using the indoor temperature sensor 180', the outdoor temperature sensor 270', and the brine temperature sensor 280' (S110).—First step.

The indoor temperature $T_{in}$ sensed in this way is compared with a first reference temperature $T_{s1'}$ (S120), and, when the indoor temperature $T_{in}$ is lower than the first reference temperature $T_{s1'}$ (for example, 25° C.), the operation of the entire air conditioning system is interrupted (S130).—Second step.

Then, by comparing the outdoor temperature $T_{out}$ with the brine temperature $T_b$ (S140), when the outdoor temperature $T_{out}$ is lower than the brine temperature $T_b$, the first indoor heat exchanger 110' and the first and second outdoor heat exchangers 210' and 230' are actuated (S150), and when the outdoor temperature $T_{out}$ is not lower than the brine temperature $T_b$, the operation of the first indoor heat exchanger 110' and the first and second outdoor heat exchangers 210' and 230' is interrupted (S160).—Third step.

The third step is defined to ensure that the operation of the first indoor heat exchanger 110' and the first and second outdoor heat exchangers 210' and 230' is interrupted in the hot summertime, when the outdoor temperature $T_{out}$ is not lower than the brine temperature $T_b$, and the first indoor heat exchanger 110' and the first and second outdoor heat exchangers 210' and 230' are actuated to use cool outdoor air in the spring, early summer, fall and winter, when the outdoor temperature $T_{out}$ is lower than the brine temperature $T_b$.

Next, by comparing the indoor temperature $T_{in}$ with a second reference temperature $T_{s2'}$ (for example, 26.5° C.) (S170), when the indoor temperature $T_{in}$ is higher than the second reference temperature $T_{s2'}$, the second indoor and third outdoor heat exchangers 150' and 240' are actuated (S180), and, when the indoor temperature $T_{in}$ is not higher than the second reference temperature $T_{s2'}$, the operation of the second indoor and third outdoor heat exchangers 150' and 240' is interrupted (S190).—Fourth step.

Also, by comparing the indoor temperature $T_{in}$ with a third reference temperature $T_{s3'}$ (for example, 27.5° C.) (S200), when the indoor temperature $T_{in}$ is higher than the third reference temperature $T_{s3'}$, the fourth outdoor heat exchanger 250' is actuated (S210), and when the indoor temperature $T_{in}$ is not higher than the third reference temperature $T_{s3'}$, the operation of the fourth outdoor heat exchanger 250' is interrupted (S220).—Fifth step.

The fourth and fifth steps are defined to ensure that, when the communication equipment 400' is not sufficiently cooled by the operation of the first indoor heat exchanger 110' and the first and second outdoor heat exchangers 210' and 230', the second indoor and third outdoor heat exchangers 150' and 240' can supplementarily operate, and, when the communication equipment 400' is not sufficiently cooled by the operation of the first indoor heat exchanger 110', the first and second outdoor heat exchangers 210' and 230', and the second indoor and third outdoor heat exchangers 150' and 240', the fourth outdoor heat exchanger 250' can supplementarily operate, so that the heat exchange efficiency of the entire air conditioning system can be continuously maintained at a constant level.

The indoor blower 170' is turned on or off depending upon whether the first and second indoor heat exchangers 110' and 150' are actuated or not (or whether the power supply to the entire air conditioning system is turned on or off), so as to supply cool air to the communication equipment 400'.

The first, second and third reference temperatures $T_{s1'}$, $T_{s2'}$ and $T_{s3'}$, inside the base station 300' can be respectively set, for example, to 25° C., 26.5° C. and 27.5° C., and can be variously changed depending upon the type of communication equipment 400' disposed in the base station 300'.

After the respective steps S130, S190, S210 and S220, the program can return to the step S110 depending upon the indoor temperature $T_{in}$ to repeat the preceding steps, as a result of which it is possible to conform in real time to the indoor temperature of the base station 300', which changes depending upon the operations of the first and second indoor and first through fourth outdoor heat exchangers 110', 150', 210', 230', 240' and 250'.

FIG. 7 is a flow chart illustrating another method for controlling the air conditioning system for communication equipment shown in FIG. 5.

In the third step, after the first indoor heat exchanger 110' and the first and second outdoor heat exchangers 210' and 230' are actuated (S150) when the outdoor temperature $T_{out}$ is lower than the brine temperature $T_b$ as a result of the comparison between the outdoor temperature $T_{out}$ and the brine temperature $T_b$ in the step S140, by comparing the brine temperature $T_b$ with a fourth reference temperature $T_{s4'}$ (for example, set to 2~7° C.) (S230), when the brine temperature $T_b$ is lower than the fourth reference temperature $T_{s4'}$, the operation of the outdoor blower 260' is interrupted (S240), and when the brine temperature $T_b$ is not lower than the fourth reference temperature $T_{s4'}$, the outdoor blower 260' is actuated (S250).—Third-first step.

In this third-first step, in the case where the brine temperature $T_b$ is lower than the fourth reference temperature $T_{s4'}$, the operation of the outdoor blower 260' is interrupted without exception (S240) in order to prevent the brine from being abruptly frozen by excessively low outdoor temperatures in wintertime, and the brine pipe 120' from thus being ruptured.

Figure 8:
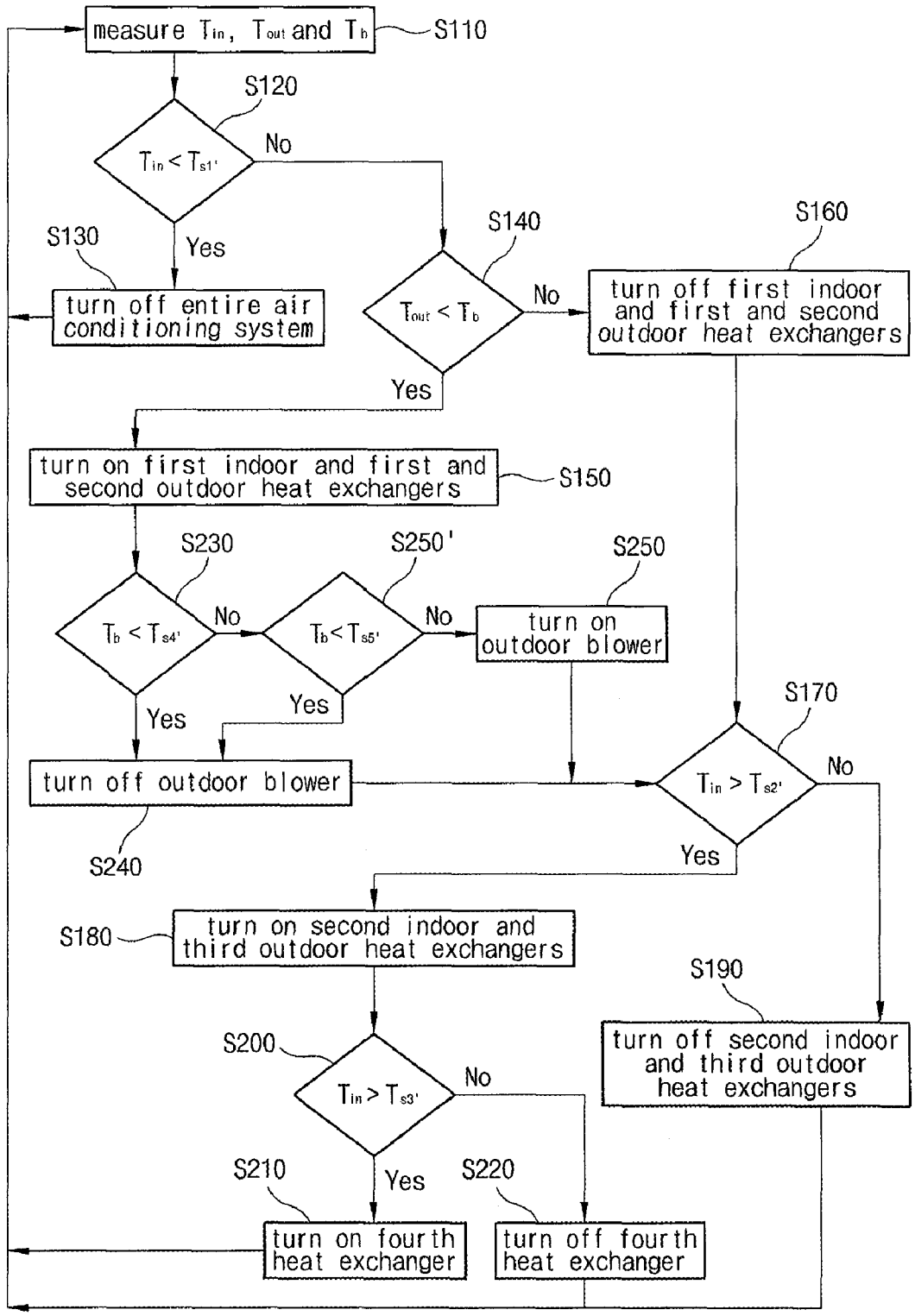
FIG. 8 is a flow chart illustrating still another method for controlling an air conditioning system for communication equipment illustrated in FIG. 5.

More preferably, as can be readily seen in FIG. 8, in the third-first step, when it is determined, as a result of the comparison in the step S230, that the brine temperature $T_b$ is not lower than the fourth reference temperature $T_{s4'}$, by comparing the brine temperature $T_b$ with a fifth reference temperature $T_{s5'}$ (for example, set to 10~15° C.) (S250'), when the brine temperature $T_b$ is lower than the fifth reference temperature $T_{s5'}$, the operation of the outdoor blower 260' is interrupted (S240), and when the brine temperature $T_b$ is not lower than the fifth reference temperature $T_{s5'}$, the outdoor blower 260' is actuated (S250).—Third-second step.

This third-second step serves to prevent the generation of overload, vibration and various noise in the outdoor blower 260' due to frequent turning on and off of the outdoor blower 260'.

As described above, the present invention adopts a scheme in which outdoor air is utilized to the maximum to cool the communication equipment 400' arranged inside the base station. In addition, since the double indoor and outdoor heat exchangers 110', 150', 210', 230', 240' and 250' are used, it is possible to follow fine temperature changes of the communication equipment 400', and the heat exchangers can complementarily operate to stably maintain the cooled state of the communication equipment.

In the drawings and specification, typical preferred embodiments of the invention have been disclosed and, although specific terms are employed, they are used in a generic and descriptive sense only and not for purposes of limitation, the scope of the invention being set forth in the following claims.

The invention claimed is:

1. An air conditioning system for communication equipment, comprising:
   an indoor module placed inside a base station in which communication equipment is installed, the indoor module having a first indoor heat exchanger which is installed on a brine pipe and has a heat exchange tube, a pair of expansion valves which are respectively installed on different refrigerant pipes, a second indoor heat exchanger which has a pair of heat exchange tubes to which the refrigerant pipes extending from the expansion valves are respectively connected, a pair of compressors which compress refrigerant having passed through the second indoor heat exchanger, and an indoor blower which is arranged adjacent to the first and second indoor heat exchangers; and
   an outdoor module placed outside the base station, the outdoor module having a brine pump which is installed on the brine pipe extending from the first indoor heat exchanger, a pair of first and second outdoor heat exchangers which have heat exchange tubes to which the brine pipe extending from the brine pump and the brine pipe extending from the first indoor heat exchanger are connected in series, a pair of third and fourth outdoor heat exchangers which have heat exchange tubes to which the refrigerant pipes extending from the compressors and the refrigerant pipes extending from the expansion valves are fluidly connected, and an outdoor blower which is arranged adjacent to the first through fourth outdoor heat exchangers.

2. The air conditioning system according to claim 1, wherein the indoor blower sequentially passes indoor air through the first and second indoor heat exchangers and supplies it to the communication equipment, and the outdoor blower sequentially passes outdoor air through the first and third outdoor heat exchangers and through the second and fourth outdoor heat exchangers and directs it to the atmosphere.

3. The air conditioning system according to claim 2, wherein an indoor temperature sensor is installed inside the base station, an outdoor temperature sensor is installed outside the base station, and a brine temperature sensor is installed on a portion of the brine pipe which extends to the outdoor module after passing through the first indoor heat exchanger.

4. A method for controlling the air conditioning system according to claim 3, comprising:
   a first step of sensing indoor and outdoor temperatures of the base station and a brine temperature using the indoor and outdoor temperature sensors and the brine temperature sensor;
   a second step of comparing the indoor temperature with a first reference temperature and interrupting operation of the entire air conditioning system when the indoor temperature is lower than the first reference temperature;
   a third step of comparing the outdoor temperature with the brine temperature, actuating the first indoor heat exchanger and the first and second outdoor heat exchangers when the outdoor temperature is lower than the brine temperature, and interrupting operation of the first indoor heat exchanger and the first and second outdoor heat exchangers when the outdoor temperature is not lower than the brine temperature;
   a fourth step of actuating the second and third outdoor heat exchangers when the indoor temperature is higher than a second reference temperature, and interrupting operation of the second and third outdoor heat exchangers when the indoor temperature is not higher than the second reference temperature; and
   a fifth step of operating the fourth outdoor heat exchanger when the indoor temperature is higher than a third reference temperature, and interrupting operation of the fourth outdoor heat exchanger when the indoor temperature is not higher than the third reference temperature.

5. The method according to claim 4, wherein the third step further comprises:
   a third-first step of interrupting operation of the outdoor blower when the brine temperature is lower than a fourth reference temperature, and actuating the outdoor blower when the brine temperature is not lower than the fourth reference temperature.

6. The method according to claim 5, wherein the third-first step further comprises:
   a third-second step of interrupting operation of the outdoor blower when the brine temperature is not lower than the fourth reference temperature and is lower than a fifth reference temperature, and actuating the outdoor blower when the brine temperature is not lower than the fifth reference temperature.

* * * * *